(12) United States Patent
Xu et al.

(10) Patent No.: US 12,299,929 B2
(45) Date of Patent: May 13, 2025

(54) MULTI-VIEW MULTI-TARGET ACTION RECOGNITION

(71) Applicants: Sony Group Corporation, Tokyo (JP); Sony Corporation of America, New York, NY (US)

(72) Inventors: Wanxin Xu, San Jose, CA (US); Ko-Kai Albert Huang, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 378 days.

(21) Appl. No.: 17/559,751

(22) Filed: Dec. 22, 2021

(65) Prior Publication Data
US 2023/0050992 A1 Feb. 16, 2023

Related U.S. Application Data

(60) Provisional application No. 63/260,108, filed on Aug. 10, 2021.

(51) Int. Cl.
*G06T 7/00* (2017.01)
*G06T 7/292* (2017.01)
(Continued)

(52) U.S. Cl.
CPC .............. *G06T 7/75* (2017.01); *G06T 7/292* (2017.01); *G06V 40/23* (2022.01)

(58) Field of Classification Search
CPC ........... G06T 7/75; G06T 7/292; G06V 40/23; G06V 10/82; G06V 20/41; G06V 20/44; G06V 40/20; G06V 20/52
See application file for complete search history.

(56) References Cited

U.S. PATENT DOCUMENTS

2015/0294496 A1* 10/2015 Medasani ............ G06T 15/205
345/420
2019/0279382 A1 9/2019 Jiang
(Continued)

FOREIGN PATENT DOCUMENTS

| CN | 112766057 A | 5/2021 |
| JP | 2017080202 A | 5/2017 |
| JP | 2020530170 A | 10/2020 |

OTHER PUBLICATIONS

Dong et al, Fast and Robust Multi-Person 3D Pose Estimation and Tracking From Multiple Views, IEEE Transactions on Pattern Analysis and Machine Intelligence, IEEE Computer Society, USA, vol. 44, No. 10, Jul. 20, 2021 (Jul. 20, 2021), pp. 6981-6992, (Year: 2021).*

(Continued)

*Primary Examiner* — Xiao Liu
(74) *Attorney, Agent, or Firm* — Trellis IP Law Group, PC

(57) ABSTRACT

Implementations generally perform robust multi-view multi-target action recognition using reconstructed 3-dimensional (3D) poses. In some implementations, a method includes obtaining a plurality of videos of a plurality of subjects in an environment, where at least one target subject of the plurality of subjects performs one or more actions in the environment. The method further includes tracking the at least one target subject across at least two cameras. The method further includes reconstructing a 3-dimensional (3D) model of the at least one target subject based on the plurality of videos and the tracking of the at least one target subject. The method further includes recognizing the one or more actions of the at least one target subject based on the reconstructing of the 3D model.

14 Claims, 10 Drawing Sheets

(51) Int. Cl.
  *G06T 7/73* (2017.01)
  *G06V 40/20* (2022.01)

(56) References Cited

U.S. PATENT DOCUMENTS

2020/0327465 A1   10/2020   Baek
2020/0387697 A1   12/2020   Chandler
2023/0386072 A1*  11/2023   Yao .................... G06T 7/251

OTHER PUBLICATIONS

Holte et al, Human Pose Estimation and Activity Recognition From Multi-View Videos: Comparative Explorations of Recent Developments, IEEE Journal of Selected Topics in Signal Processing, vol. 6, No. 5, pp. 538-552, Sep. 2012.*

Dong et al, Fast and robust multi-person 3d pose estimation from multiple views. In CVPR, (Year: 2019).*

Iskakov et al, Learnable Triangulation of Human Pose, ICCV, pp. 7718-7727 (Year: 2019).*

Dong Junting et al: "Fast and Robust Multi-Person 3D Pose Estimation and Tracking From Multiple Views", IEEE Transactions on Pattern Analysis and Machine Intelligence, IEEE Computer Society, USA, vol. 44, No. 10, Jul. 20, 2021 (Jul. 20, 2021), pp. 6981-6992, XP011919697, ISSN: 0162-8828, DOI:10.1109/TPAMI. 2021.3098052 [retrieved on Jul. 20, 2021].

Z. Tang, R. Gu and J. Hwang, "Joint Multi-View People Tracking and Pose Estimation for 3D Scene Reconstruction," 2018 IEEE International Conference on Multimedia and Expo (ICME), 2018, pp. 1-6, doi: 10.1109/ICME.2018.8486576.

Tanaka [ thinning and graph matching of "volume data besides Shusuke ] The case base human body attitude presumption "and IEICE Transactions on Information and Systems . which were used D, information system = The IEICE transactions on information andsystems, Jun. 2008, Institute of Electronics, Information and Communication Engineers, the 91st volume, No. 6, pp. 1580-1591.

* cited by examiner

MULTI-VIEW MULTI-TARGET ACTION RECOGNITION

CROSS REFERENCE TO RELATED APPLICATIONS

This application claims priority from U.S. Provisional Patent Application No. 63/260,108, entitled "ROBUST MULTI-VIEW MULTI-TARGET ACTION RECOGNITION USING RECONSTRUCTED 3D POSES," filed Aug. 10, 2021 (Client Reference No. SYP340606US01), which is hereby incorporated by reference as if set forth in full in this application for all purposes.

BACKGROUND

Action recognition has become an active research area and such research continues to rapidly advance. Some camera systems are able to capture videos of a person, analyze movements of the person, and generate an image or video dataset of metadata. To identify human actions captured by camera videos of the system, a person needs to manually view the videos. Manual monitoring and event reporting can be unreliable and time-consuming, especially where the positions and angles of the video cameras may vary and might not provide adequate coverage. Multiple cameras may be used in a controlled environment. However, subjects, movements, and background variation may still be substantially limited. Also, understanding the pose information of multiple people in complex environments remains a challenge.

SUMMARY

Embodiments generally relate to multi-view multi-target action recognition. In some embodiments, a system includes one or more processors, and includes logic encoded in one or more non-transitory computer-readable storage media for execution by the one or more processors. When executed, the logic is operable to cause the one or more processors to perform operations including: obtaining a plurality of videos of a plurality of subjects in an environment, where at least one target subject of the plurality of subjects performs one or more actions in the environment; tracking the at least one target subject across at least two cameras; reconstructing a 3-dimensional (3D) model of the at least one target subject based on the plurality of videos and the tracking of the at least one target subject; and recognizing the one or more actions of the at least one target subject based on the reconstructing of the 3D model.

With further regard to the system, in some Embodiments, the plurality of videos that are obtained are 2-dimensional (2D) videos. In some embodiments, the logic when executed is further operable to cause the one or more processors to perform operations including determining one or more key points for the at least one target subject. In some embodiments, the logic when executed is further operable to cause the one or more processors to perform operations including determining pose information associated with the at least one target subject. In some embodiments, the logic when executed is further operable to cause the one or more processors to perform operations including reconstructing the 3D model based on pose information. In some embodiments, the logic when executed is further operable to cause the one or more processors to perform operations including: determining pose information associated with the at least one target subject; and recognizing the one or more actions of the at least one target subject based on the determining of the pose information. In some embodiments, the logic when executed is further operable to cause the one or more processors to perform operations including distinguishing between different actions of a plurality of actions of the at least one target subject based on the reconstructing of the 3D model.

In some embodiments, a non-transitory computer-readable storage medium with program instructions thereon is provided. When executed by one or more processors, the instructions are operable to cause the one or more processors to perform operations including: obtaining a plurality of videos of a plurality of subjects in an environment, where at least one target subject of the plurality of subjects performs one or more actions in the environment; tracking the at least one target subject across at least two cameras; reconstructing a 3-dimensional (3D) model of the at least one target subject based on the plurality of videos and the tracking of the at least one target subject; and recognizing the one or more actions of the at least one target subject based on the reconstructing of the 3D model.

With further regard to the computer-readable storage medium, in some embodiments, the plurality of videos that are obtained are 2-dimensional (2D) videos. In some embodiments, the instructions when executed are further operable to cause the one or more processors to perform operations including determining one or more key points for the at least one target subject. In some embodiments, the instructions when executed are further operable to cause the one or more processors to perform operations including determining pose information associated with the at least one target subject. In some embodiments, the instructions when executed are further operable to cause the one or more processors to perform operations including reconstructing the 3D model based on pose information. In some embodiments, the instructions when executed are further operable to cause the one or more processors to perform operations including: determining pose information associated with the at least one target subject; and recognizing the one or more actions of the at least one target subject based on the determining of the pose information. In some embodiments, the instructions when executed are further operable to cause the one or more processors to perform operations including distinguishing between different actions of a plurality of actions of the at least one target subject based on the reconstructing of the 3D model.

In some embodiments, a method includes: obtaining a plurality of videos of a plurality of subjects in an environment, where at least one target subject of the plurality of subjects performs one or more actions in the environment; tracking the at least one target subject across at least two cameras; reconstructing a 3-dimensional (3D) model of the at least one target subject based on the plurality of videos and the tracking of the at least one target subject; and recognizing the one or more actions of the at least one target subject based on the reconstructing of the 3D model.

With further regard to the method, in some embodiments, the plurality of videos that are obtained are 2-dimensional (2D) videos. In some embodiments, the method further includes determining one or more key points for the at least one target subject. In some embodiments, the method further includes determining pose information associated with the at least one target subject. In some embodiments, the method further includes reconstructing the 3D model based on pose information. In some embodiments, the method further includes determining pose information associated with the at least one target subject; and recognizing the one or more actions of the at least one target subject based on the determining of the pose information.

A further understanding of the nature and the advantages of particular implementations disclosed herein may be realized by reference of the remaining portions of the specification and the attached drawings.

DETAILED DESCRIPTION

Implementations described herein enable, facilitate, and manage robust multi-view multi-target action recognition using reconstructed 3-dimensional (3D) poses. As described in more detail herein, implementations recognize multi-camera multi-target actions by utilizing information of reconstructed 3D poses as prior knowledge along with a skeleton-based neural network. Implementations described herein achieve higher performance than deep learning methods in complex environments. Implementations described herein differentiate actions of similar movement patterns and are also more flexible and scalable than existing deep learning techniques without requiring significant additional data for training.

Implementations have various potential application areas. Such areas may include, for example, behavior understanding in medical or sports fields. Applications may vary, depending on the particular application. Other example application areas may include human-computer interaction, surveillance and security, retail industries, manufacturing industries, etc.

In various implementations, a system obtains multiple videos of multiple subjects in an environment, where at least one target subject of the multiple subjects performs one or more actions in the environment. The system further tracks the at least one target subject across at least two cameras. The system further reconstructs a 3D model of the at least one target subject based on the videos and the tracking of the at least one target subject. The system further recognizes the one or more actions of the at least one target subject based on the reconstructing of the 3D model.

Figure 1:
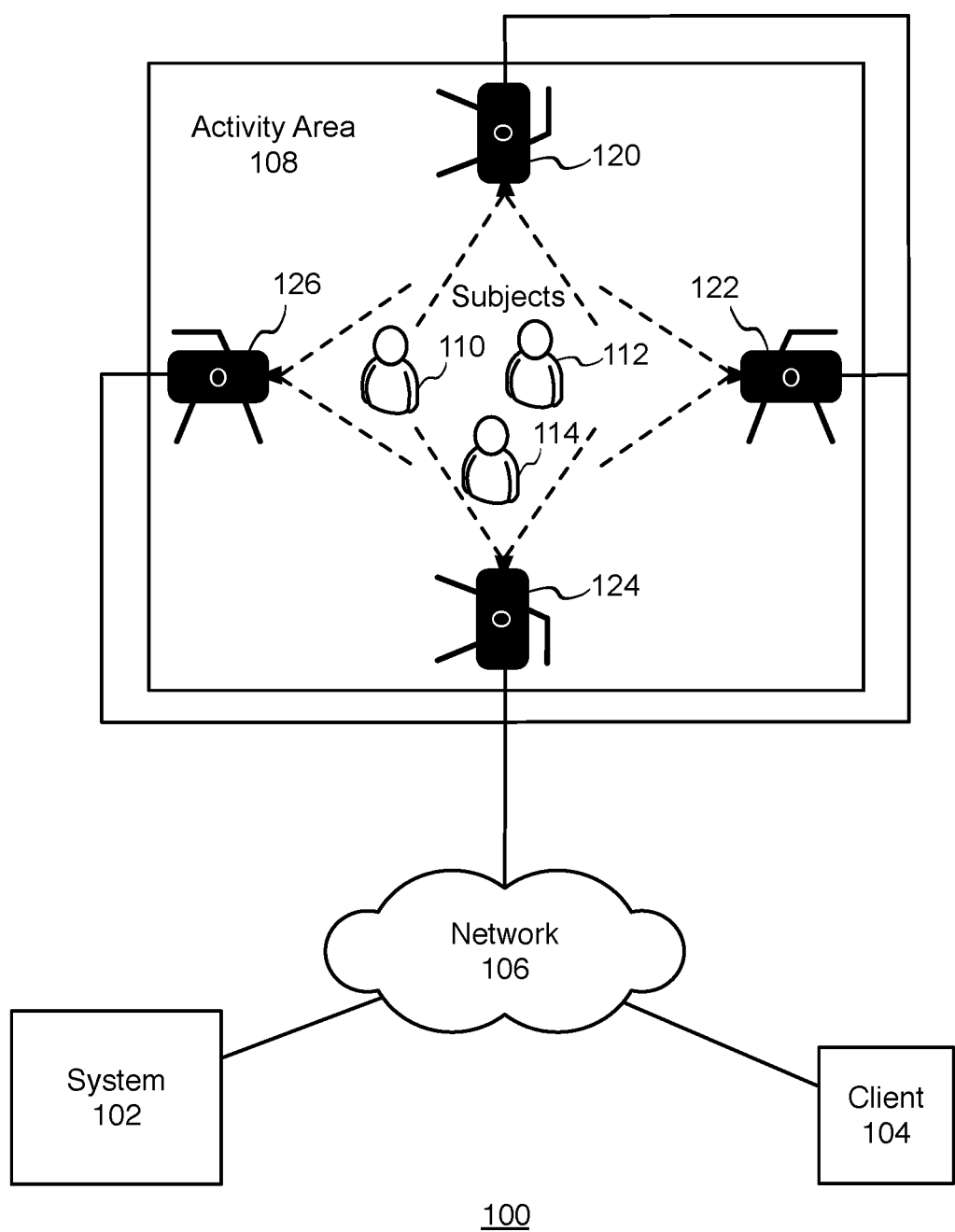
FIG. 1 is a block diagram of an example environment 100 for recognizing actions of multiple people using multiple cameras, which may be used for implementations described herein.

FIG. 1 is a block diagram of an example environment 100 for recognizing actions of multiple people using multiple cameras, which may be used for implementations described herein. As described in more detail herein, system 102 is a context-aware system that provides robust recognitions of actions of multiple people using multiple cameras. In some implementations, environment 100 includes a system 102, which communicates with a client 104 via a network 106. Network 106 may be any suitable communication network such as a Wi-Fi network, Bluetooth network, the Internet, etc.

In various implementations, environment 100 may be any environment, where activity involving multiple subjects (e.g., multiple people and/or multiple objects, etc.) is recognized, monitored, and tracked by system 102. In various implementations, environment 100 may be any setting including work settings and public settings. For example, in some implementations, environment 100 may be a retail store, a clinical setting, a public park, etc. In various implementations, system 102, client 104, and network 106 may be local to environment 100, remote to environment 100 (e.g., in the cloud), or a combination thereof.

Shown is an activity area 108, which may be an indoor area or outdoor area in environment 100. In some scenarios, activity area 108 may include indoor and outdoor portions. The configuration of activity area 108 may vary, depending on the particular implementation. For example, a portion of activity area 108 may include an indoor seating area of a restaurant and may include an outdoor patio seating area of the restaurant.

Also shown are people or subjects 110, 112, and 114. While example subjects are described in the context of people, subjects may also include inanimate objects, all of which are captured by multiple video cameras 120, 122, 124, and 126.

In various implementations, the videos are captured by multiple video cameras. For example, as shown, system 102 monitors the activity of subjects or people 110, 112, 114, etc. in an activity area 108 using physical video cameras 120, 122, 124, 126, which capture video of people 110, 112, 114 at different angles or viewpoints.

In various implementations, system 102 identifies at least one target subject from the multiple subjects. While various implementations are described in the context of a single target subject, these implementations also apply to each of multiple target subjects. As such, the system tracks one or more target subjects, reconstructs one or more 3D models of the target subjects, and recognizes actions of the one or more target subjects. Various example implementations directed to these aspects are described in more detail herein. In various implementations, each of subjects 110, 112, 114, etc. may represent one or more people. Also, implementations and references to a particular target subject may apply to any and all target subjects. The number of target subjects may vary, depending on the particular implementation. For example, in various scenarios, subjects 110, 112, 114 may represent one or more of clinicians such as a doctor and nurse, one or more assistants, a patient, etc. In various implementations, in addition to subjects 110, 112, and 114, there may also be one or more inanimate objects (not shown) that the system may track. For example, in various scenarios, objects may include one or more hospital beds, surgery equipment, surgery tools, etc. The particular type of object may vary and will depend on the particular implementation.

In various implementations, a given subject may also be referred to as a subject, a person, a target subject, an object, or an inanimate object.

In various implementations, the system utilizes vision-based approaches, which are efficient in that there is no need for subjects to have any wearable equipment. Vision-based approaches are also highly scalable to different settings of the system. In various implementations, the system automatically and accurately recognizes activity in a clinical environment (e.g., operating room, emergency room, etc.), which enables understanding of surgical or clinical workflow that is critical for optimizing clinical activities. The system performs real-time monitoring of staff and patient activities in an environment in order to enhance patient outcomes and care with reduced staff costs.

In various implementations, physical video cameras 120, 122, 124, and 126 are positioned at various locations in order to capture multiple videos and/or still images from different points of view of the same object, including at different angles and/or at different distances. The terms cameras and video cameras may be used interchangeably. These different points of view make the appearance of different objects more distinguishable.

For ease of illustration, FIG. 1 shows one block for each of system 102, client 104, network 106, and activity area 108. Blocks 102, 104, 106, and 108 may represent multiple systems, client devices, networks, and activity areas. Also, there may be any number of subjects in a given activity area. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2:
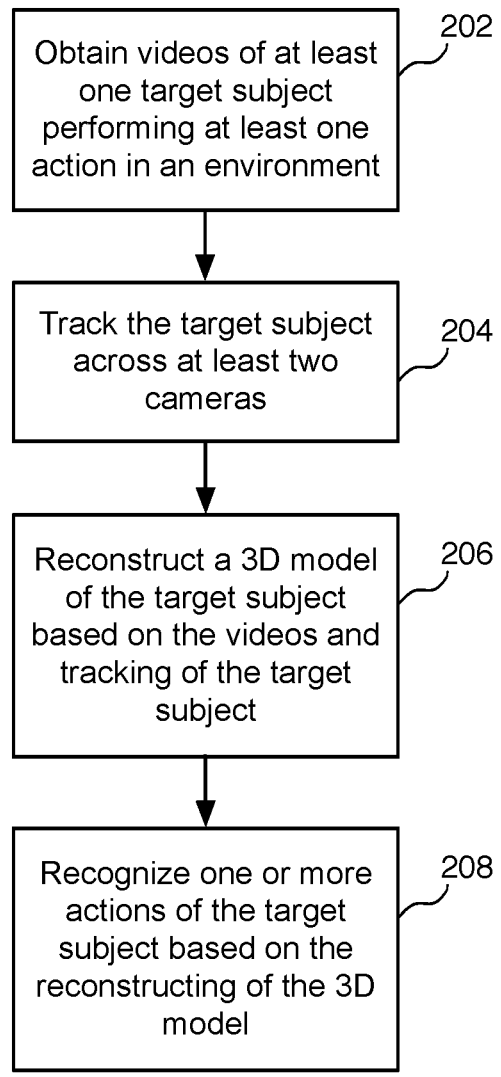
FIG. 2 is an example flow diagram for recognizing actions of multiple people using multiple cameras, according to some implementations.

FIG. 2 is an example flow diagram for recognizing actions of multiple people using multiple cameras, according to some implementations. Referring to both FIGS. 1 and 2, a method is initiated at block 202, where a system such as system 102 receives or obtains multiple videos of multiple subjects in activity area 108 of environment 100. The multiple subjects captured in the videos include at least one target subject to be tracked, where the target subject performs at least one action in environment 100. In various implementations, the cameras records the videos, and may store the videos in any suitable storage location. In various implementations, video sequences are captured from multiple cameras, where the cameras may be configured with predetermined (including pre-calibrated) camera parameters. Such camera parameters may include one or more intrinsic matrices, one or more extrinsic matrices, etc. While various example implementations are described in the context of the target subject, these implementations may also apply to one or more or all of the other subjects captured in the videos. In other words, there may be multiple target subjects tracked, where the system recognizes actions of each target subject being tracked.

At block 204, system 102 tracks the at least one target subject across at least two cameras (e.g., video cameras 120, 122, 124, 126, etc.). The number of cameras and their positions relative to the target subject(s) may vary, depending on the particular implementation. In various implementations, the videos that are obtained are 2-dimensional (2D) videos. In various implementations, the system avoids cross-view association ambiguity by processing 2D video information from multiple cameras. Noisy and incomplete 2D poses resulting from occlusions may complicate the associations of a given pose from different cameras, which may further influence the reconstruction of the pose in 3D space. By utilizing multiple cameras, the system may track each individual object from camera to camera without losing sight of the object.

In various implementations, the system determines one or more key points for one or more of the subjects that the system tracks via the video cameras including the target subject. The system also determines and/or estimates pose information associated with one or more of the objects or subjects including the target subject. In various implementations, the system may perform 2D pose estimations using any suitable pose estimator and pre-calibrated cameras. The system also determines pose information based on the respective key points associated with each object or subject tracked. In various implementations, the system determines pose information associated with the at least one target subject based on triangulation. Further implementations directed to key points, pose information, and triangulation are described in more detail herein.

At block 206, system 102 reconstructs a 3-dimensional (3D) model of the target subject based on the videos and the tracking of the target subject. In various implementations, the system reconstructs the 3D model of the object or target subject based on the videos, where the videos are 2D videos. As described above, the system determines pose information associated with the target subject. In various implementations, the system reconstructs the 3D model based on the pose information.

As indicated herein, while various example implementations are described in the context of the target subject, these implementations may also apply to one or more or all of the other subjects (e.g., multiple target subjects) captured in the videos. The reconstruction of a 3D model may be applied to various areas. For example, such areas may be applied to behavior understanding in medical or sports field, surveillance and security, retail or manufacture industry, etc. The particular application may vary and will depend on the particular implementation.

At block 208, system 102 recognizes the one or more actions of the target subject based on the reconstructing of the 3D model. In various implementations, system 102 determines or estimates pose information associated with actions of the target subject. The system then recognizes the one or more actions of the target subject based on the pose information associated with the at least one target subject and in association with the reconstructing of the 3D model. The system distinguishes between different actions of the target subject based on the reconstructing of the 3D model, including the pose determinations or pose estimations.

In various implementations, the system recognizes the actions of multiple subjects utilizing a set of pre-calibrated cameras efficiently and robustly. Such pre-calibrated camera may include cameras 120, 122, 124, and 126, for example.

Figure 8:
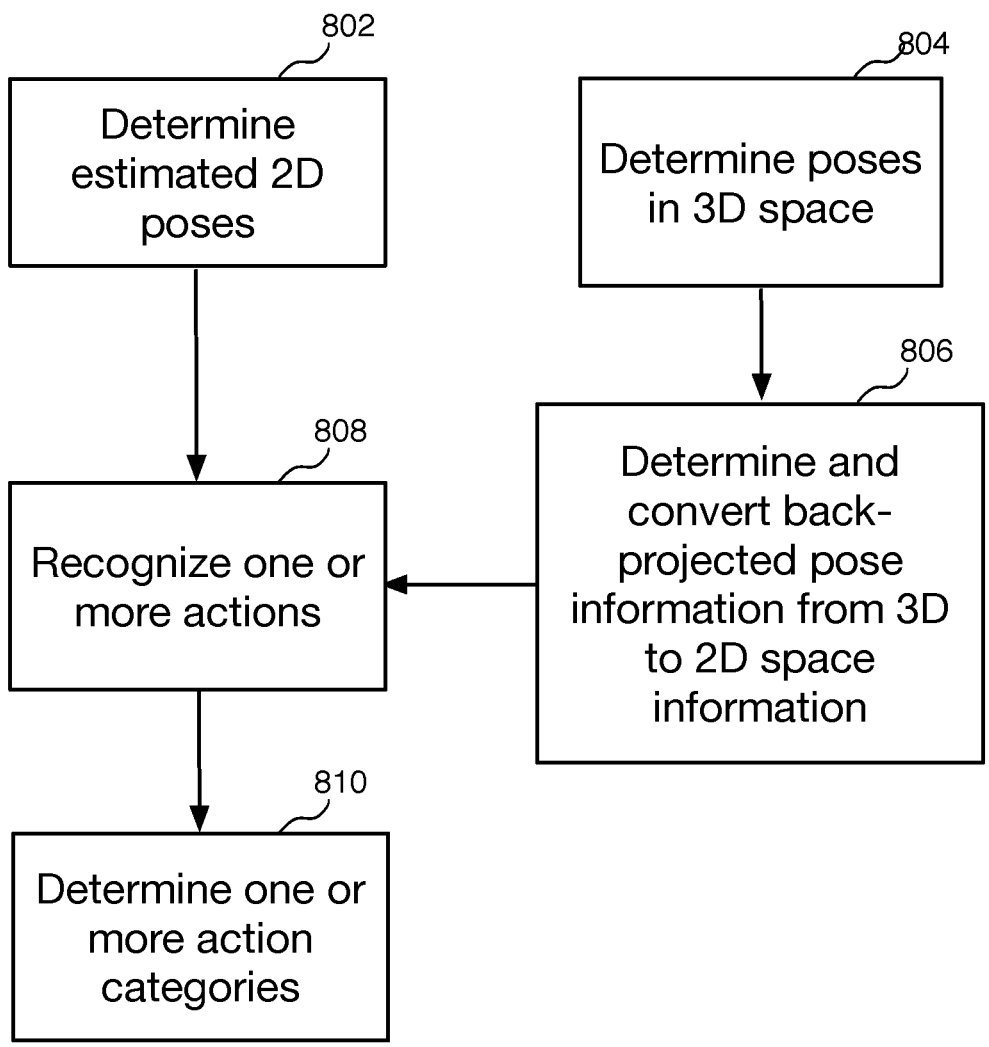
FIG. 8 is an example flow diagram for recognizing actions of a target subject, according to some implementations.

Further example implementations directed to recognition of actions of the target subject based on the reconstructing of the 3D model are described in more detail herein, in connection with FIG. 8, for example.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following FIG. 3 through FIG. 7 and associated descriptions involve various aspects directed to the reconstructing of the 3D model. FIG. 8 and associated descriptions involve various aspects directed to the recognition of actions of the target subject. These implementations described apply to any one or more subjects captured on video, including any and all target subjects captured in the videos.

Figure 3:
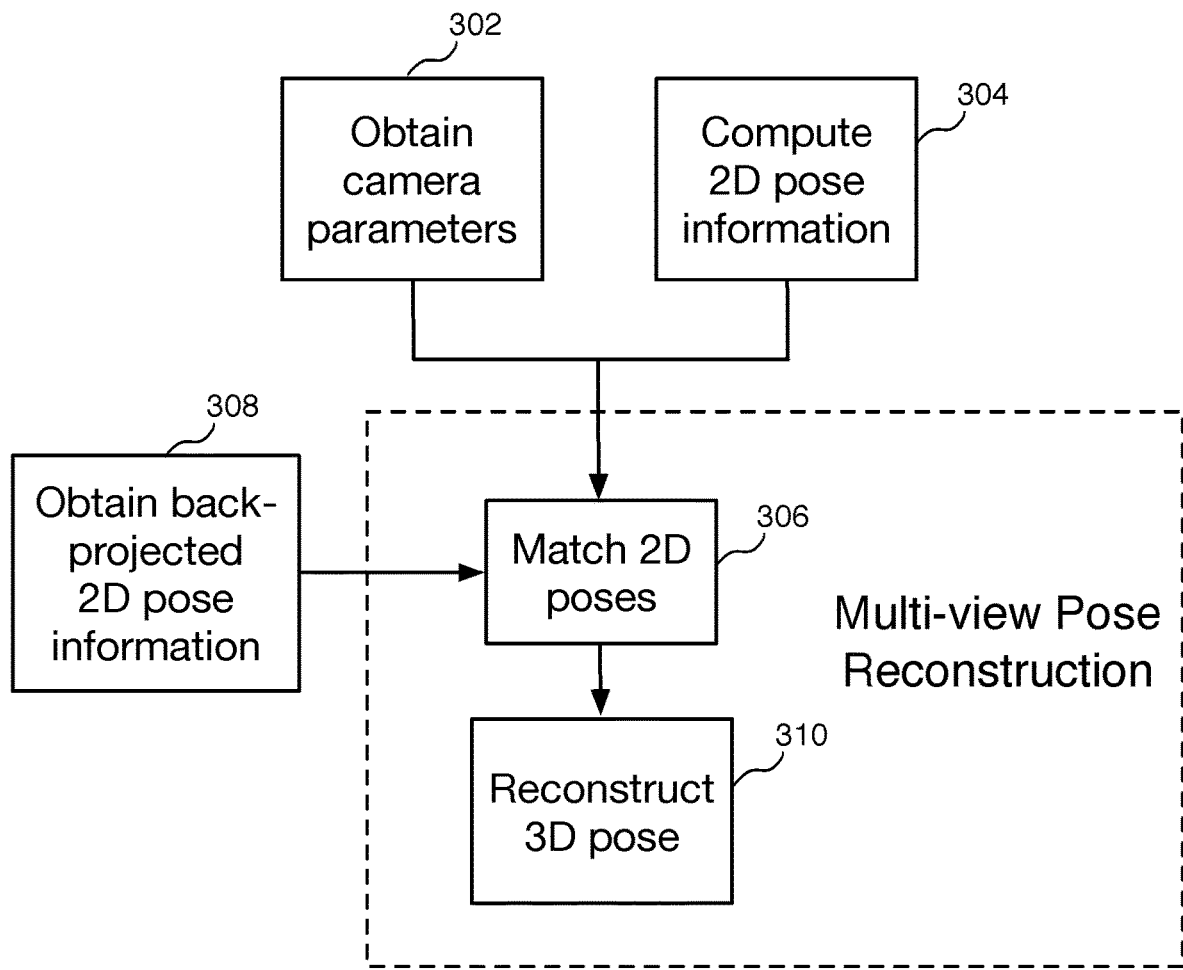
FIG. 3 is an example flow diagram for reconstructing a multi-view pose, according to some implementations.

FIG. 3 is an example flow diagram for reconstructing a multi-view pose, according to some implementations. The following details describe pose reconstruction and a tracking framework, according to some implementations. Referring to both FIGS. 1 and 3, a method is initiated at block 302, where a system such as system 102 obtains camera parameters. In various implementations, the camera parameters may include an intrinsic matrix and an extrinsic matrix for each camera in the system, depending on the setting of the environment.

At block 304, system 102 computes two-dimensional (2D) pose information. In various implementations, to compute the 2D pose information, the system may utilize a general key point estimator and use either a top-down or bottom-up approach.

At block 306, system 102 matches 2D poses. In various implementations, the pose matching maintains and tracks the identity of each target subject captured on video consistent across multiple cameras. In various implementations, the system may apply one or more metrics for matching. Example metrics may include epipolar constraints, a Euclidean distance and algorithm for data association, a Hungarian algorithm, etc.

In an example scenario, the system may associate the 2D poses of the same person across different camera views by using geometric and cycle-consistent constraints, etc. As such, if a person leaves the field of view of one camera, the same person will be captured in the field of view of another camera in the same environment. In various implementations, the system may track the movement and pose of a person based on detection and knowledge of portions of the person such as joints of limbs, height, joint and limb positions, trajectory of the person, etc.

In contrast to previous methods that associate the poses across cameras frame-by-frame, implementations described herein reduce computations by using the pose tracking information in 3D space.

At block 308, system 102 obtains back-projected 2D pose information. In various implementations, the system may obtain back-projected 2D pose information by projecting 3D pose information from block 310 (described below) to an image plane. In various implementations, tracking information from 3D space provides guidance to the current frame for pose matching at block 306.

At block 310, system 102 reconstructs a 3D pose. In various implementations, the system determines the 3D location of a pose based on multiple 2D corresponding poses and triangulation. Implementations directed to triangulation are described in more detail herein in connection with FIG. 7, for example.

Figure 4:
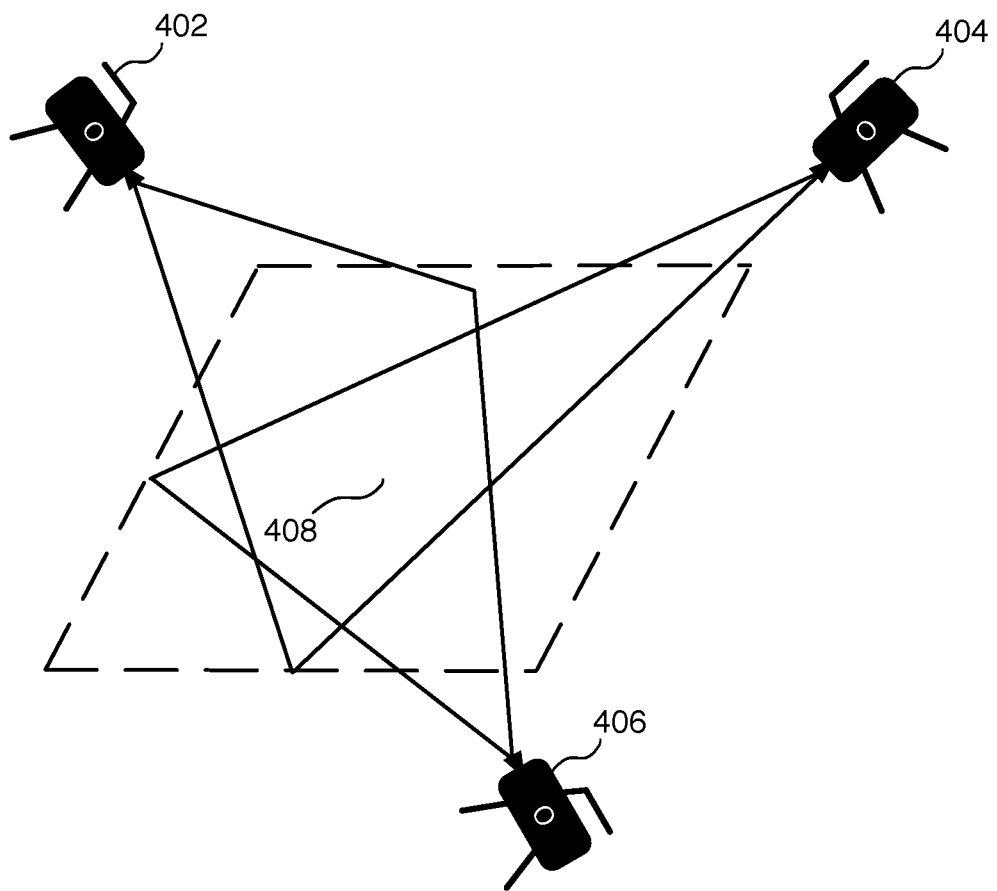
FIG. 4 is a block diagram of an example environment for recognizing clinical activity using multiple cameras and an overlap region, which may be used for implementations described herein.

FIG. 4 is a block diagram of an example environment 400 for recognizing clinical activity using multiple cameras and an overlap region, which may be used for implementations described herein. Environment 400 includes cameras 402, 404, and 406. In various implementations, cameras 402-406 may be positioned at different locations.

In various implementations, cameras 402-406 may be positioned at different locations such that their fields of view overlap. As shown, the fields of view of cameras 402, 404, and 406 overlap at overlap region 408. When a given subject or subjects (e.g., staff, patient, etc.) is positioned in overlap region 408, each of cameras 402, 404, and 406 is able to capture footage of the given subject or subjects.

In various implementations, cameras 402-406 are set up pre-calibrated to avoid occlusion and to enable 3D reconstruction of subjects in the environment. In various implementations, the subjects used for calibration are visible by all the cameras simultaneously. While 3 cameras are shown, there may be any number of cameras in environment 400. The particular number of cameras may depend on the particular environment. In various implementations, the system uses cameras 402-406 to monitor subjects such as tile on floor in order to calibrate patterns in the environment. Alternative camera calibration methods may be used including a commonly used checkerboard pattern or using red-green-blue-depth (RGB-D) cameras.

Figure 5:
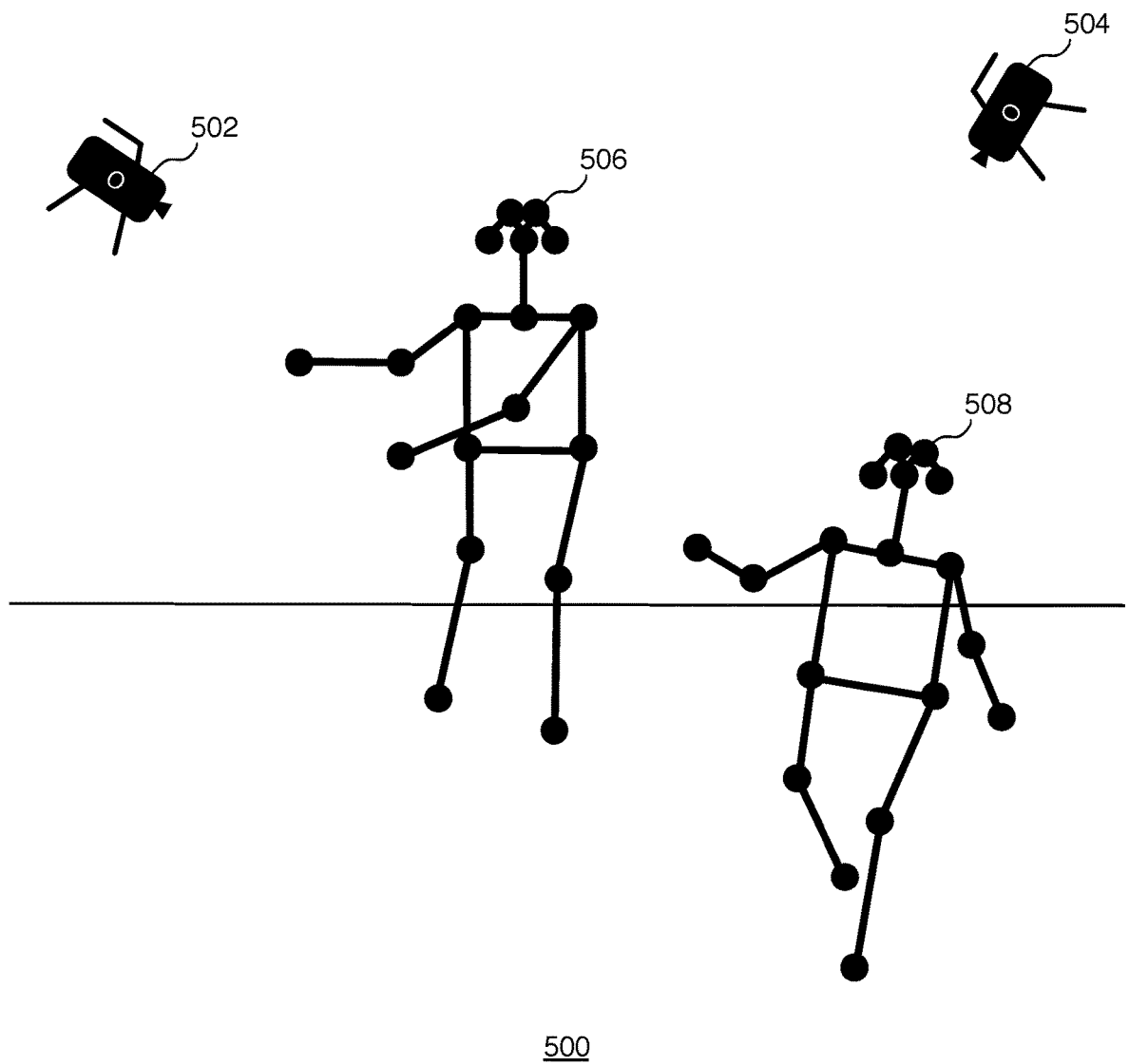
FIG. 5 is a block diagram of an example environment for recognizing clinical activity, which may be used for implementations described herein.

FIG. 5 is a block diagram of an example environment 500 for recognizing clinical activity, which may be used for implementations described herein. Shown are cameras 502 and 504, which capture video footage of subjects 506 and 508. Subjects 506 and 508 may be, for example, staff members in an operating room, or a staff member and a patient in the operating room, etc.

In various implementations, the system performs data fusion and clinical action recognition, including skeleton-based activity recognition. As indicated above, in various implementations, data fusion is a process that associates or fuses the pose of a person from one camera to the pose of the same person from other cameras. After data fusion, the system reconstructs the 3D poses of all subjects (e.g., staff, patient, etc.) in a virtual 3D space, given multiple 2D corresponding poses.

The system recognizes the actions of each staff member and the patient based on their skeletal poses. Such actions may include standing, walking, crouching, sitting, etc. The system may utilize an action classifier to recognize such actions. The processes of the system are robust to visual noise such as background subjects (e.g., people, objects, etc.) and irrelevant objects (e.g., clothing texture, etc.) compared with RGB images or depth maps. Alternative methods may include recognizing actions directly from images or depth maps. In some implementations, the system may achieve additional gains by tracking poses in the reconstructed 3D space, and extracting skeleton features from both spatial and temporal space.

Figure 6:
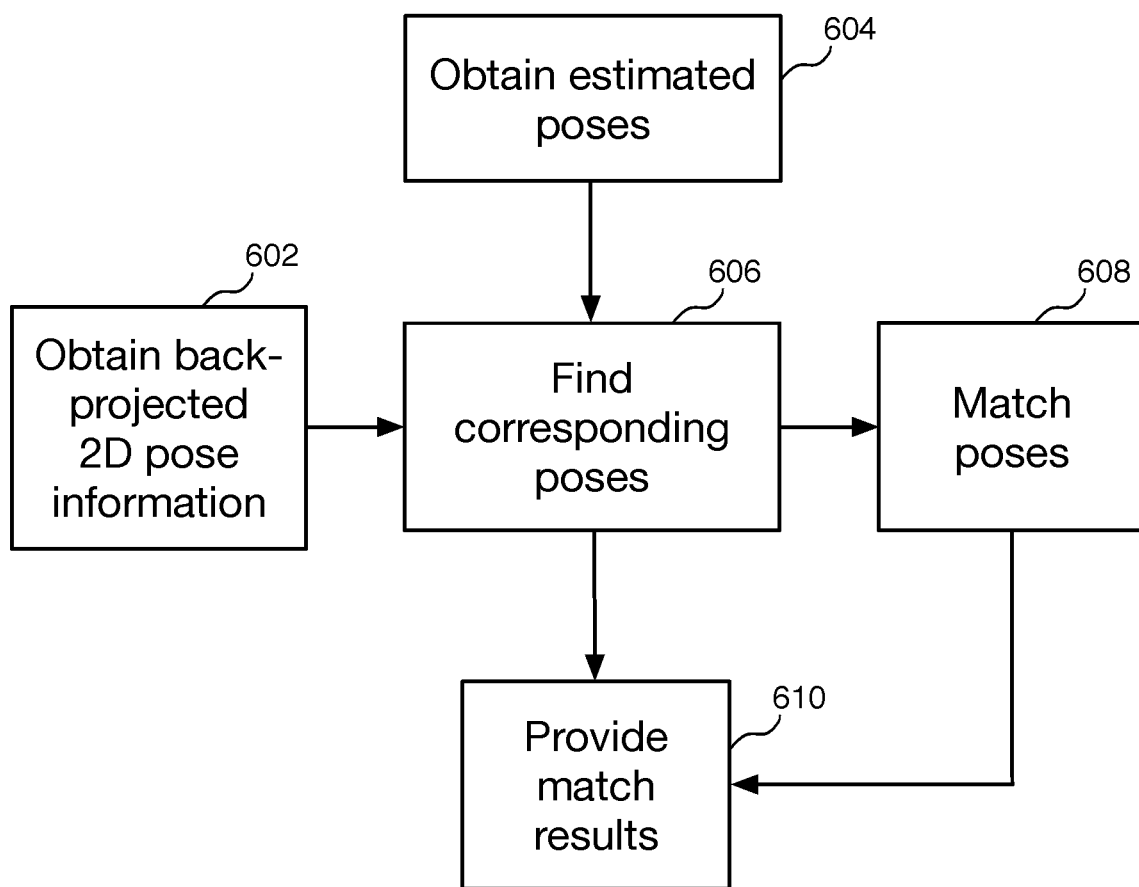
FIG. 6 is an example flow diagram for determining a multi-view pose, according to some implementations.

FIG. 6 is an example flow diagram for determining a multi-view pose, according to some implementations. Referring to both FIGS. 1 and 6, a method is initiated at block 602, where a system such as system 102 obtains back-projected 2D pose information.

At block 604, system 102 obtains estimated poses. The system collects estimated poses for each subject detected by the cameras.

At block 606, system 102 finds corresponding poses. Such corresponding poses may include different poses of the same subject (e.g., person) captured by different cameras.

At block 608, system 102 matches poses. For example, the system matches the poses from the same subject (e.g., person) from the different cameras. In some implementations, the system performs the pose matching step if the pose fails to be matched to any existing tracklets. A tracklet may be defined as a fragment of a track followed by a moving subject, as constructed by an image recognition system.

In various implementations, the system may apply one or more metrics for matching. Example metrics may include epipolar constraints, a Euclidean distance and algorithm for data association, a Hungarian algorithm, etc.

At block 610, system 102 provides match results. The match results indicate all of the poses of each particular subject (e.g., person).

Figure 7:
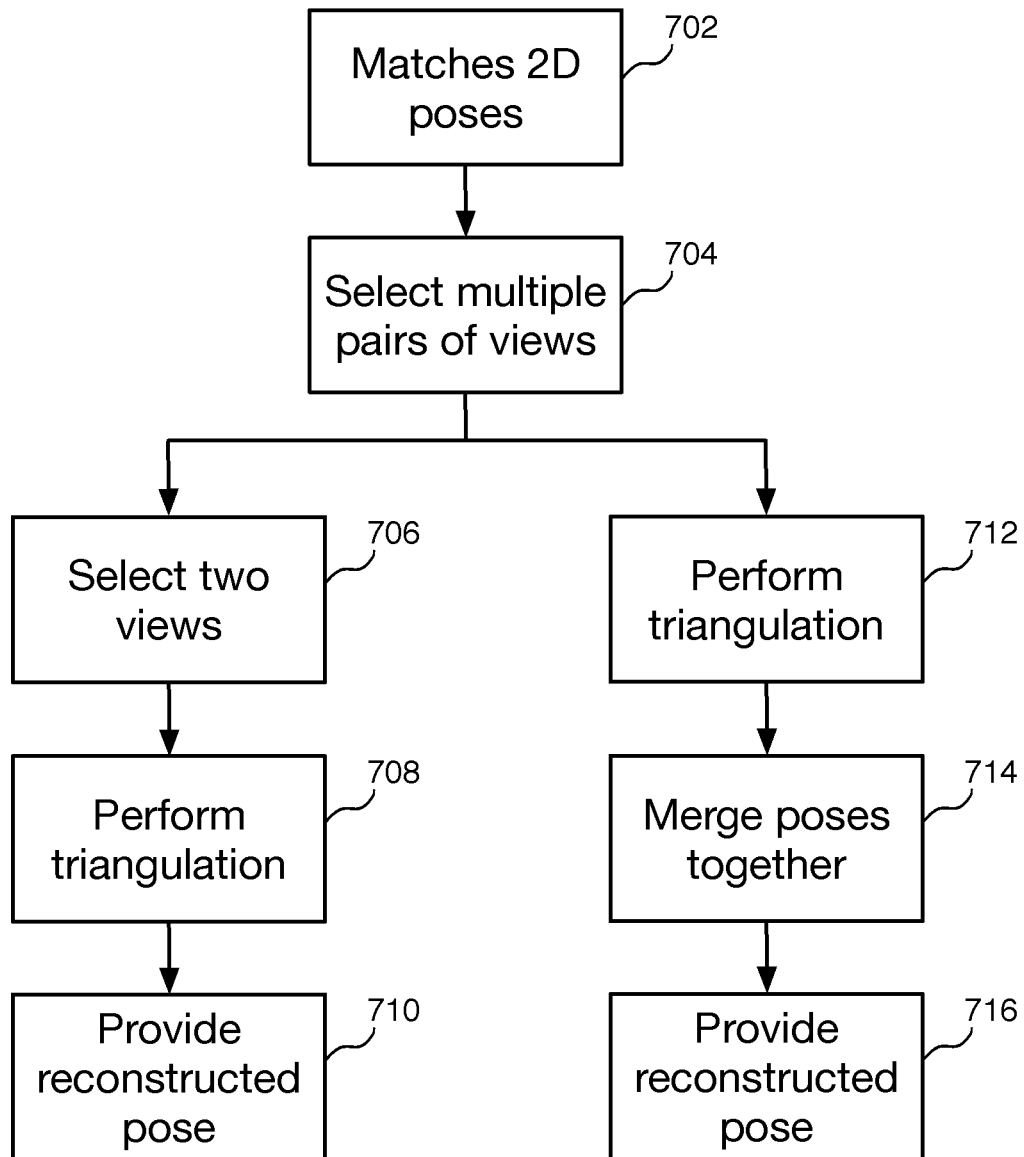
FIG. 7 is an example flow diagram for providing a reconstructed pose, according to some implementations.

FIG. 7 is an example flow diagram for providing a reconstructed pose, according to some implementations. Referring to both FIGS. 1 and 7, a method is initiated at block 702, where a system such as system 102 matches 2D poses.

At block 704, system 102 selects multiple pairs of views from the 2D poses. In various implementations, the system obtains each pair from a different camera. In various implementations, the selection of the multiple pairs of views may be based on two conditions. In some implementations, the first condition may be to select pairs of views based on a re-projection error being below a predetermined threshold. In some implementations, the second condition may be to select pairs of views based on a confidence score being greater than a predetermined threshold. For example, a higher confidence score may be associated with less occlusion, and a lower confidence score may be associated with more occlusion. The selection may be achieved by minimizing the re-projection error and by maximizing the confidence score for accurate 3D reconstruction.

As described below, the method follows two series of steps to provide the reconstructed pose. The first series is associated with blocks 706, 708, and 710. The system performs these steps if the set of pairs of views are not empty. The second series is associated with blocks 712, 714, and 716. The system performs these steps if no pairs of views are chosen.

At block 706, system 102 selects two views. In various implementations, the system selects two views with a maximum-rank confidence score and a minimum-rank reprojection error. The system may use the two views to perform triangulation for 3D pose reconstruction, as described below in connection with block 708.

At block 708, system 102 performs triangulation. In various implementations, the system may utilize adaptive triangulation. Triangulation may be used to obtain 3D pose information based on given 2D matched poses in the multi-view framework. In some implementations, the system may adaptively select a subset of camera views for 3D pose reconstruction instead of performing reconstruction over all cameras. For example, to minimize computation, the system may determine the cameras that capture a given target subject. Other cameras that do not capture the given subject are not needed and thus not used to collect information for that particular subject. Using only the cameras that capture the subject ensures that the system performs sufficient yet not excessive computations.

At block 710, system 102 provides a reconstructed pose. In various implementations, the system determines the 3D location of each pose of the same subject (e.g., clinician, patient, etc.) based on multiple 2D corresponding poses and triangulation. The system determines the poses from the video feed of the multiple cameras in order to reconstruct a 3D pose of each subject.

As indicated above, the second series is associated with blocks 712, 714, and 716. The system performs these steps if no pairs of views are chosen.

At block 712, system 102 performs triangulation. In various implementations, system 102 performs triangulation similarly to step 708 described above.

At block 714, system 102 merges poses together. For example, in various implementations, the system aggregates the poses of each subject (e.g., clinician, patient, etc.) from different viewpoints of the different cameras capturing each subject.

At block 716, system 102 provides a reconstructed pose. In various implementations, system 102 performs triangulation similarly to step 710 described above.

FIG. 8 is an example flow diagram for recognizing actions of a target subject, according to some implementations. Referring to both FIGS. 1 and 8, a method is initiated at block 802, where a system such as system 102 determines estimated 2D poses. The system collects estimated 2D poses for each subject detected by the cameras. In various implementations, the system determines the time [t] of each estimated 2D pose.

At block 804, system 102 determines poses in 3D space. The system collects estimated poses for each subject detected by the cameras. In various implementations, the system utilizes a skeleton-based approach with reconstructed 3D poses to help improve the robustness of action recognition. For example, in some implementations, the system may determine the height of a target subject in absolute values (e.g., 5'8", etc.), or the height relative to the height of other subjects (e.g., taller by 2", shorter by 1", etc.). In some implementations, the system may determine the center of mass of the target subject. The center of mass may be useful in determining the position of the target subject relative to other subjects (e.g., people, objects, etc.). The system may determine a movement trajectory of the target subject relative to another subject (e.g., walking past a particular other subject, etc.).

At block 806, system 102 determines and converts back-projected pose information from 3D space to 2D space information. In various implementations, the system may utilize 3D position information from previous frames in order to differentiate similar actions from one another. For example, the system determines the time [t] and back-projected times (t-n) of the back-projected pose information. The system may compare the pose of the target subject at different times based on previous frames to collect pose information about the target subject in 3D space and 2D space.

At block 808, system 102 recognizes one or more actions of the target subject. The system may determine various actions, order of actions, and times of actions. For example, the system may determine if the target subject was seated, if the target subject was standing, and the order and times that the target subject seated and standing.

In various implementations, the system may use various machine learning or deep learning techniques to recognize the actions. For example, the system may use convolutional neural network (CNN), a recurrent neural network (RNN), a graph convolutional network (GCN), or other suitable neural network(s) to recognize one or more actions of the target subject.

At block 810, system 102 determines one or more action categories for the recognized action or actions of the target subject. For example, the system may categorize a given action as a transition action (e.g., seated to standing, etc.). In another example, the system may categorize a given action as a movement (e.g., walking, raising a hand, etc.). In another example, the system may categorize a given action as a handling of an object (e.g., picking up a computer, inserting a key in a door, etc.). The particular categories may vary, depending on the particular implementation.

The system uses the reconstructed poses in a 3D virtual space as prior knowledge, and the system recognizes the actions for all target subjects in the scene with a deep learning based approach. Implementations may be built upon any 2D and/or 3D pose estimation systems. In an example scenario, the system may detect if a target subject is committing a crime or other unacceptable behavior based on the actions and categories of actions. In another example scenario, the system may monitor a target subject as the target subject is playing a video game (e.g., tracking movements of the target subject in the context of the video game, etc.).

Implementations are robust to occlusion, which may occur frequently in practical applications where multiple observed subjects are involved. This may involve self-occlusion. For example, a given target subject may move to a position that is blocked by another subject from a given camera. This may also involve inter-object occlusion, where a given target subject is blocked by an object from a given camera. Using multiple cameras and tracking the target subject based on the 3D model avoids such occlusion issues. For example, in some implementations, the system may distinguish between positions of subjects based on respective key points, and track these positions. Likewise, the system identifies and tracks distinct actions of the various subjects, including one or more target subjects. The system may determine which portions of a given subject are occluded. By tracking relative key points, the system may ascertain the positions and actions using the 3D model based on multiple cameras and multiple respective fields of view. Implementations require minimum data for optimal performance, unlike conventional systems that require a certain amount of data for efficient analysis and training.

Implementations also apply to uncontrolled environments, where there may be a lack of distinguishable visual information due to motion blur and illumination variations. The system may adapt to motion blur by accessing video from the multiple cameras, where some cameras might not experience motion blur. In various implementations, the system adapts to illumination variation and changes based on the 3D model. For example, the system may detect changes in illumination based on one or more cameras. The system may adjust or recalibrate one or more of the cameras automatically without human intervention. These functions may apply to various real-world applications (e.g., healthcare, security, human-computer interaction and etc.).

Implementations described herein provide various benefits. For example, implementations described herein are simple yet effective in multi-camera multi-target pose reconstruction in 3D. Implementations described herein also provide a cost-effective solution for pose matching, which serves as an important step for further 3D pose reconstruction. Implementations described herein achieve higher performance than deep learning methods. Implementations described herein are also more flexible and scalable than existing deep learning techniques without requiring a significant additional data for training. The ability to recognize actions of multiple target subjects has an advantage of also tracking interactions or exchanges between two or more target subjects (e.g., interactions in a ball game, sale transactions in a retail store, etc.).

Figure 9:
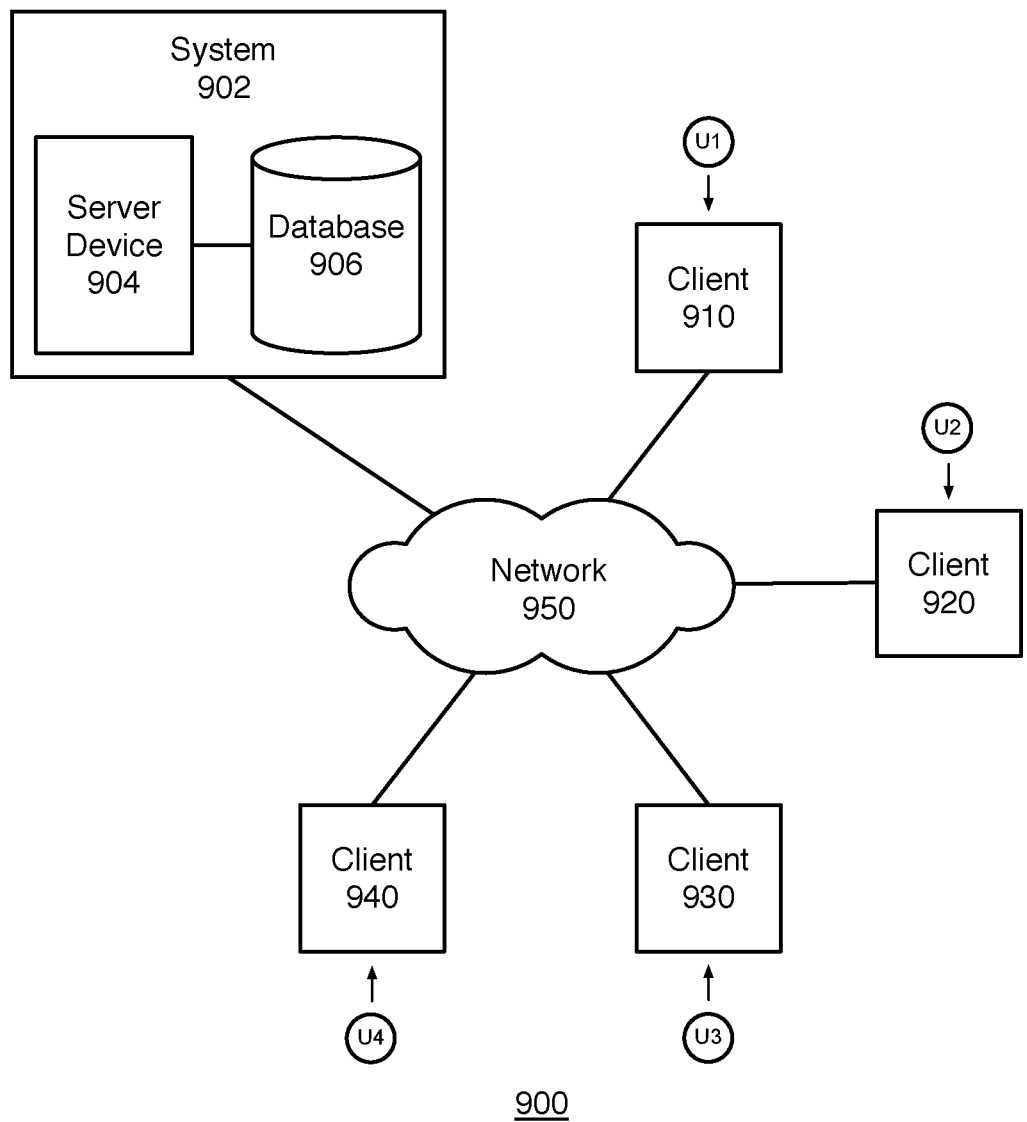
FIG. 9 is a block diagram of an example network environment, which may be used for some implementations described herein.

FIG. 9 is a block diagram of an example network environment 900, which may be used for some implementations described herein. In some implementations, network environment 900 includes a system 902, which includes a server device 904 and a database 906. For example, system 902 may be used to implement system 102 of FIG. 1, as well as to perform implementations described herein. Network environment 900 also includes client devices 910, 920, 930, and 940, which may communicate with system 902 and/or may communicate with each other directly or via system 902. Network environment 900 also includes a network 950 through which system 902 and client devices 910, 920, 930, and 940 communicate. Network 950 may be any suitable communication network such as a Wi-Fi network, Bluetooth network, the Internet, etc.

For ease of illustration, FIG. 9 shows one block for each of system 902, server device 904, and network database 906, and shows four blocks for client devices 910, 920, 930, and 940. Blocks 902, 904, and 906 may represent multiple systems, server devices, and network databases. Also, there may be any number of client devices. In other implementations, environment 900 may not have all of the components shown and/or may have other elements including other types of elements instead of, or in addition to, those shown herein.

While server device 904 of system 902 performs implementations described herein, in other implementations, any suitable component or combination of components associated with system 902 or any suitable processor or processors associated with system 902 may facilitate performing the implementations described herein.

In the various implementations described herein, a processor of system 902 and/or a processor of any client device 910, 920, 930, and 940 cause the elements described herein (e.g., information, etc.) to be displayed in a user interface on one or more display screens.

Figure 10:
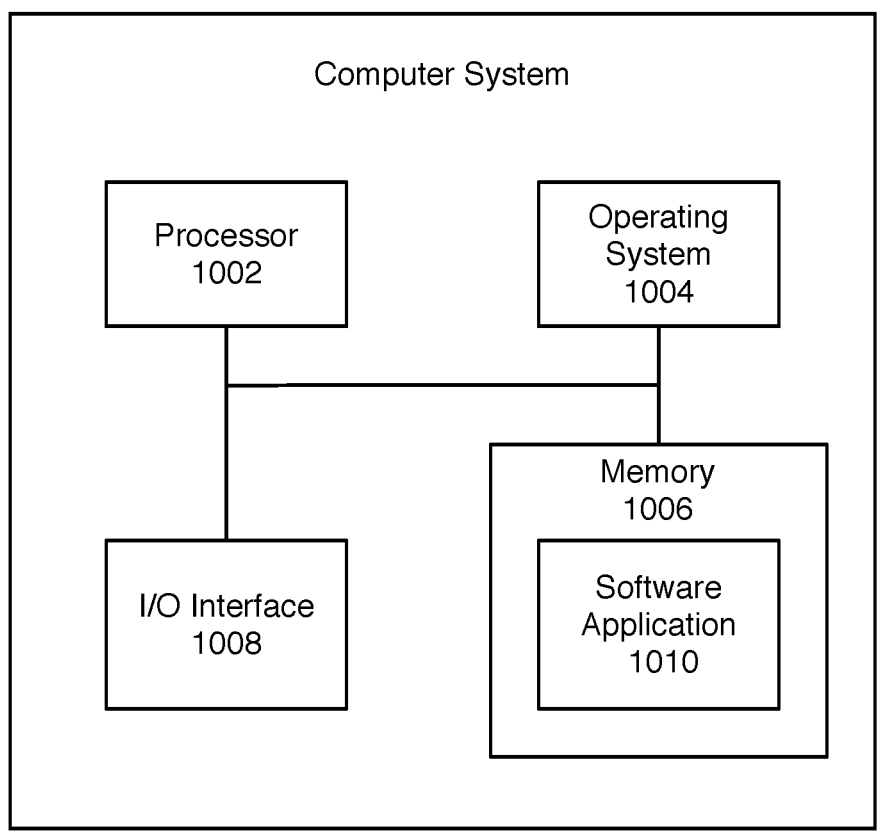
FIG. 10 is a block diagram of an example computer system, which may be used for some implementations described herein.

FIG. 10 is a block diagram of an example computer system 1000, which may be used for some implementations described herein. For example, computer system 1000 may be used to implement server device 904 of FIG. 9 and/or system 102 of FIG. 1, as well as to perform implementations described herein. In some implementations, computer system 1000 may include a processor 1002, an operating system 1004, a memory 1006, and an input/output (I/O) interface 1008. In various implementations, processor 1002 may be used to implement various functions and features described herein, as well as to perform the method implementations described herein. While processor 1002 is described as performing implementations described herein, any suitable component or combination of components of computer system 1000 or any suitable processor or processors associated with computer system 1000 or any suitable system may perform the steps described. Implementations described herein may be carried out on a user device, on a server, or a combination of both.

Computer system 1000 also includes a software application 1010, which may be stored on memory 1006 or on any other suitable storage location or computer-readable medium. Software application 1010 provides instructions that enable processor 1002 to perform the implementations described herein and other functions. Software application may also include an engine such as a network engine for performing various functions associated with one or more networks and network communications. The components of computer system 1000 may be implemented by one or more processors or any combination of hardware devices, as well as any combination of hardware, software, firmware, etc.

For ease of illustration, FIG. 10 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, computer system 1000 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, and transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   obtaining a plurality of videos of a plurality of subjects in an environment, wherein at least one target subject of the plurality of subjects performs one or more actions in the environment;
   tracking the at least one target subject across at least two cameras;
   determining pose information associated with the at least one target subject, wherein the determining of pose information is based on triangulation;
   reconstructing a 3-dimensional (3D) model of the at least one target subject based on the plurality of videos, the tracking of the at least one target subject, and the pose information;
   determining back-projected pose information from the 3D model;
   converting the back-projected pose information to 2D space information; and
   recognizing the one or more actions of the at least one target subject based on the reconstructing of the 3D model and the 2D space information.

2. The system of claim 1, wherein the plurality of videos that are obtained are 2-dimensional (2D) videos.

3. The system of claim 1, wherein the logic when executed is further operable to cause the one or more processors to perform operations comprising determining one or more key points for the at least one target subject.

4. The system of claim 1, wherein the logic when executed is further operable to cause the one or more processors to perform operations comprising:
- determining pose information associated with the at least one target subject; and
- recognizing the one or more actions of the at least one target subject based on the determining of the pose information.

5. The system of claim 1, wherein the logic when executed is further operable to cause the one or more processors to perform operations comprising distinguishing between different actions of a plurality of actions of the at least one target subject based on the reconstructing of the 3D model.

6. A non-transitory computer-readable storage medium with program instructions stored thereon, the program instructions when executed by one or more processors are operable to cause the one or more processors to perform operations comprising:
- obtaining a plurality of videos of a plurality of subjects in an environment, wherein at least one target subject of the plurality of subjects performs one or more actions in the environment;
- tracking the at least one target subject across at least two cameras;
- determining pose information associated with the at least one target subject, wherein the determining of pose information is based on triangulation;
- reconstructing a 3-dimensional (3D) model of the at least one target subject based on the plurality of videos, the tracking of the at least one target subject, and the pose information;
- determining back-projected pose information from the 3D model;
- converting the back-projected pose information to 2D space information; and
- recognizing the one or more actions of the at least one target subject based on the reconstructing of the 3D model and the 2D space information.

7. The computer-readable storage medium of claim 6, wherein the plurality of videos that are obtained are 2-dimensional (2D) videos.

8. The computer-readable storage medium of claim 6, wherein the instructions when executed are further operable to cause the one or more processors to perform operations comprising determining one or more key points for the at least one target subject.

9. The computer-readable storage medium of claim 6, wherein the instructions when executed are further operable to cause the one or more processors to perform operations comprising:
- determining pose information associated with the at least one target subject; and
- recognizing the one or more actions of the at least one target subject based on the determining of the pose information.

10. The computer-readable storage medium of claim 6, wherein the instructions when executed are further operable to cause the one or more processors to perform operations comprising distinguishing between different actions of a plurality of actions of the at least one target subject based on the reconstructing of the 3D model.

11. A computer-implemented method comprising:
- obtaining a plurality of videos of a plurality of subjects in an environment, wherein at least one target subject of the plurality of subjects performs one or more actions in the environment;
- tracking the at least one target subject across at least two cameras;
- determining pose information associated with the at least one target subject, wherein the determining of pose information is based on triangulation;
- reconstructing a 3-dimensional (3D) model of the at least one target subject based on the plurality of videos, the tracking of the at least one target subject, and the pose information;
- determining back-projected pose information from the 3D model;
- converting the back-projected pose information to 2D space information; and
- recognizing the one or more actions of the at least one target subject based on the reconstructing of the 3D model and the 2D space information.

12. The method of claim 11, wherein the plurality of videos that are obtained are 2-dimensional (2D) videos.

13. The method of claim 11, further comprising determining one or more key points for the at least one target subject.

14. The method of claim 11, further comprising:
- determining pose information associated with the at least one target subject; and
- recognizing the one or more actions of the at least one target subject based on the determining of the pose information.

* * * * *